United States Patent
Kamiya

(10) Patent No.: US 10,933,568 B2
(45) Date of Patent: Mar. 2, 2021

(54) RESIN MOLDING AND METHOD FOR PRODUCING THE SAME

(71) Applicant: TOYOTA BOSHOKU KABUSHIKI KAISHA, Aichi-ken (JP)

(72) Inventor: Hideo Kamiya, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 227 days.

(21) Appl. No.: 15/950,873

(22) Filed: Apr. 11, 2018

(65) Prior Publication Data

US 2018/0297255 A1 Oct. 18, 2018

(30) Foreign Application Priority Data

Apr. 14, 2017 (JP) .............................. JP2017-080753

(51) Int. Cl.
*B29C 70/08* (2006.01)
*B29C 45/14* (2006.01)
*B29L 31/30* (2006.01)

(52) U.S. Cl.
CPC ........ *B29C 45/14508* (2013.01); *B29C 70/08* (2013.01); *B29C 2045/14893* (2013.01);
(Continued)

(58) Field of Classification Search
CPC ........ B29C 45/14467; B29C 45/14508; B29C 2045/14893; B60R 13/0212;
(Continued)

(56) References Cited

U.S. PATENT DOCUMENTS

| | | | |
|---|---|---|---|
| 5,944,324 A | 8/1999 | Schultheis et al. | |
| 2001/0008321 A1* | 7/2001 | Ito ..................... | B60H 1/00671 264/250 |

(Continued)

FOREIGN PATENT DOCUMENTS

| | | |
|---|---|---|
| CN | 102574549 | 7/2012 |
| CN | 105034253 | 11/2015 |

(Continued)

OTHER PUBLICATIONS

Chinese Office Action, Chinese Patent Office, Application No. 201810332379.4, dated Jan. 20, 2020, with English machine translation.

(Continued)

*Primary Examiner* — Travis M Figg
(74) *Attorney, Agent, or Firm* — Greenblum & Bernstein, P.L.C.

(57) ABSTRACT

To provide a resin molding and a method for producing the same.
A resin molding in which two types of substrates differing in thermal shrinkage are connected together, wherein the thermal shrinkage of a connection part of the two types of substrates is a value between the respective thermal shrinkages of the two types of substrates. It is preferred that the connection part be constituted of an end part of any one substrate of the two substrates. More specifically, there can be adopted an embodiment in which one substrate is a plate-like substrate including reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate. Moreover, the connection part can be formed by adjusting the filling density of reinforcing fibers in an end part of the (Continued)

one substrate to be lower than the filling density of reinforcing fibers in the base part of the one substrate.

6 Claims, 4 Drawing Sheets

(52) U.S. Cl.
CPC .............. *B29K 2995/0012* (2013.01); *B29L 2031/3041* (2013.01); *B32B 2262/02* (2013.01); *B32B 2262/06* (2013.01); *Y10T 428/24603* (2015.01)

(58) Field of Classification Search
CPC ........ B60R 13/0243; B29K 2995/0012; B29L 2031/3041
See application file for complete search history.

(56) References Cited

U.S. PATENT DOCUMENTS

| | | | |
|---|---|---|---|
| 2003/0076662 A1* | 4/2003 | Miehling | G06K 19/07724 361/760 |
| 2003/0175467 A1* | 9/2003 | Campbell | B29C 66/12841 428/61 |
| 2004/0209032 A1* | 10/2004 | Wani | B29C 45/1671 428/57 |
| 2007/0190203 A1* | 8/2007 | Kim | B29C 45/0025 425/542 |
| 2007/0295732 A1 | 12/2007 | Albert et al. | |
| 2009/0242104 A1* | 10/2009 | Watanabe | B29C 70/506 156/181 |
| 2012/0280536 A1* | 11/2012 | Malek | B62D 29/041 296/193.09 |
| 2013/0108835 A1* | 5/2013 | Kamiya | B29C 45/1418 428/170 |
| 2013/0255103 A1* | 10/2013 | Dua | B29C 66/244 36/87 |
| 2014/0234631 A1* | 8/2014 | Iino | B29C 65/8246 428/412 |
| 2014/0272436 A1 | 9/2014 | Akita et al. | |
| 2015/0306801 A1* | 10/2015 | Ito | B32B 27/08 428/99 |
| 2015/0321398 A1* | 11/2015 | Bharathan | B29C 39/02 264/254 |

FOREIGN PATENT DOCUMENTS

| | | |
|---|---|---|
| DE | 19943674 | 3/2001 |
| DE | 101 01 527 A1 | 8/2002 |
| DE | 10 2015 208 184 A1 | 11/2015 |
| EP | 2743053 | 6/2014 |
| JP | 2001-315161 | 11/2001 |
| JP | 2013-082090 | 5/2013 |
| JP | 2016-036955 | 3/2016 |

OTHER PUBLICATIONS

Germany Office Action, Germany Patent Office, Application No. 10 2018 108 676.8, dated Oct. 29, 2020, with English translation.

* cited by examiner

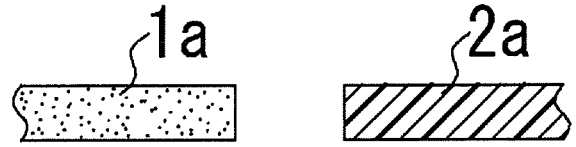
Fig. 1(a)  Fig. 1(b)
Fig. 2
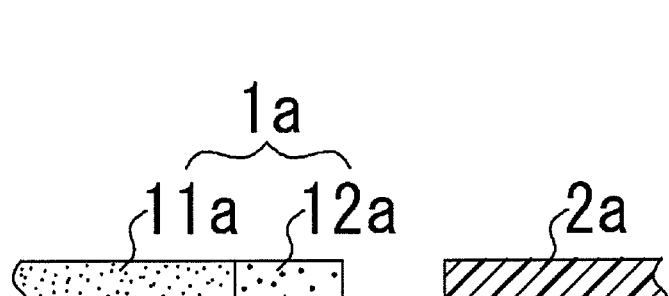
Fig. 3(a)  Fig. 3(b)
Fig. 4
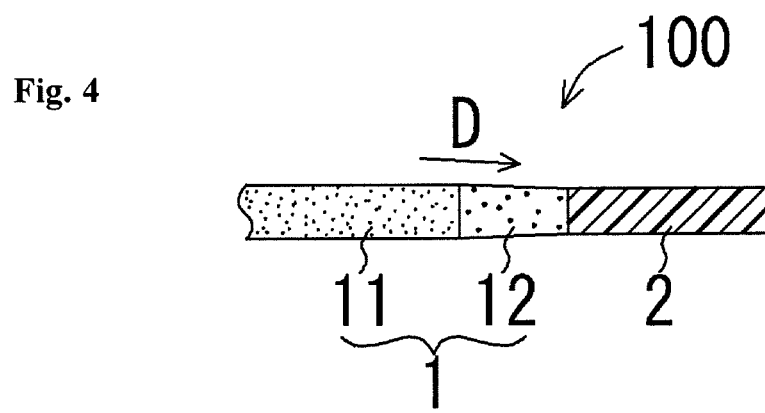

Fig. 5
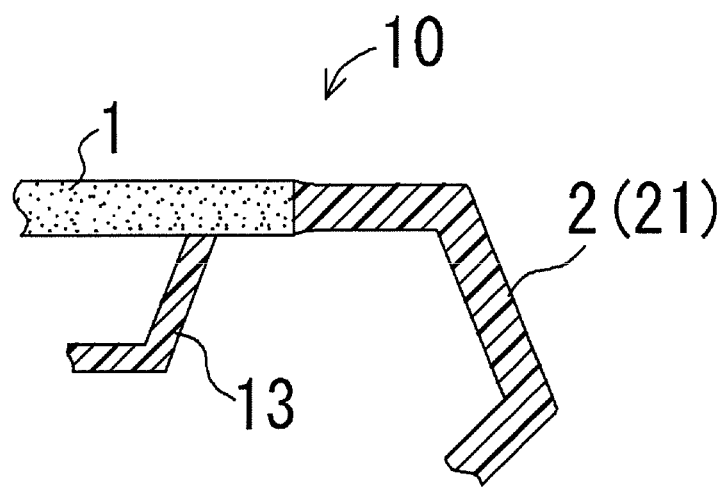
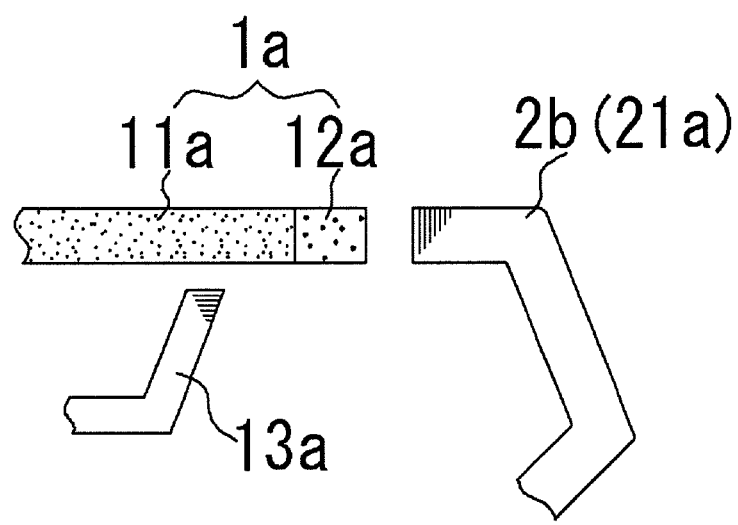
Fig. 6(a)  Fig. 6(b)

RESIN MOLDING AND METHOD FOR PRODUCING THE SAME

CROSS-REFERENCE TO RELATED APPLICATIONS

The present application claims priority under 35 U.S.C. § 119 of Japanese Application No. 2017-80753 filed on Apr. 14, 2017, the disclosure of which is expressly incorporated by reference herein in its entirety.

BACKGROUND

1. Technical Field

The present invention relates to a resin molding and a method for producing the same. Particularly, the present invention relates to a resin molding in which two types of substrates differing in thermal shrinkage are connected together and the thermal shrinkage of the connection part is a value between the respective thermal shrinkages of the two types of substrates, and a method for producing the same.

2. Related Art

There is known a molding method wherein, when obtaining a resin molding of a soft member by insert molding, a difference in level is provided at a welded part of a soft member part and a molded resin part in the plane direction of both the parts and the pressure of the resin to be injected is prevented from being applied strongly in the plane direction of the soft member inserted (see, for example, JP-A-2001-315161), and distortion of the soft member part of the resin molding is thereby prevented. It is also disclosed that, in the resin molding disclosed in JP-A-2001-315161, distortion due to shrinkage of a tip part of the soft member part is prevented or suppressed by providing the tip part of the soft member part with a corrugated shape.

When the resin molding is a vehicle interior material, an under shape structure for attaching the internal material to a vehicle panel, such as a retainer bracket, a boss, or a runner, is attached to the substrate on the rear surface thereof, which is to be located opposite from the compartment. Such an under shape structure has been provided by injection-molding a thermoplastic resin to the rear surface of the substrate simultaneously with press-molding of the substrate. In a vehicle interior material, such as a door trim or a roof trim, an aesthetic under shape part has been provided at a peripheral part of the plate-like substrate, and the aesthetic under shape part can be formed by injecting resin against an end surface of the plate-like substrate.

SUMMARY

As described above, there has been known a technology of providing a difference in level in a welded part so that the pressure of the resin to be injected is prevented from being applied strongly in the plane direction of the soft member part inserted.

On the other hand, described in an application filed on the same day by the same applicant of this invention, when resin moldings differing in thermal shrinkage are welded to each other on their end surfaces, a difference in level may be produced near the joined part due to the difference in thermal shrinkage in the resulting resin molding (see a preliminary molded substrates 1a, 2a in FIG. 1 and a resin molding 10 after connection in FIG. 2). If a difference in level is thus produced near the joined part, this may entail deterioration of the aesthetic nature even if a skin material is stacked to the resin molding on its side that will become an aesthetic surface when being used as an interior material for vehicles, such as a door trim or a roof trim. Therefore, it is necessary to produce a resin molding in which the thickness changes gradually near the joined part and an apparent difference in level is not observed visually even if a difference in level between one molding and another molding made of resins differing in thermal shrinkage cannot be avoided.

The present invention has been devised in light of the above-described state of the conventional technologies and the above-described problem; a difference in level is may be produced near the joined part, and one object thereof is to provide a resin molding in which the thermal shrinkage of a connection part of two types of substrates is any value between the respective thermal shrinkages of the two types of substrates, increasing an aesthetic nature.

Another object is to provide a resin molding with an increased aesthetic nature in which the one substrate is a plate-like substrate including reinforcing fibers and a first thermoplastic resin and the other substrate is an injection-molded member connected to the one substrate, wherein the thermal shrinkage of the other substrate is large as compared to the thermal shrinkage of the one substrate and the connection part has been constituted by adjusting the filling density of reinforcing fibers in an end part of the one substrate to be lower than the filling density of reinforcing fibers in a base part of the one substrate, and a method for producing the same.

The present invention is as follows.

1. A resin molding in which two types of substrates differing in thermal shrinkage are connected together,
wherein the thermal shrinkage of a connection part of the two types of substrates is a value between the respective thermal shrinkages of the two types of substrates.

2. The resin molding according to claim 1, wherein the connection part is constituted of an end part of any one substrate of the two types of substrates.

3. The resin molding according to claim 2, wherein the one substrate is a plate-like substrate comprising reinforcing fibers and a first thermoplastic resin binding the reinforcing fibers to each other and
the other substrate is an injection-molded member connected in the plate face direction of the one substrate,
wherein the thermal shrinkage of the other substrate is large as compared to the thermal shrinkage of the one substrate.

4. The resin molding according to claim 3, wherein the filling density of the reinforcing fibers in the end part of the one substrate is lower than the filling density of the reinforcing fibers in a base part of the one substrate.

5. The resin molding according to claim 1, wherein the connection part is constituted of an end part of any one substrate of the two types of substrates,
wherein the one substrate is a plate-like substrate comprising reinforcing fibers and a first thermoplastic resin binding the reinforcing fibers to each other and
the other substrate is an injection-molded member connected in the plate face direction of the one substrate,
wherein the thermal shrinkage of the other substrate is large as compared to the thermal shrinkage of the one substrate,
and wherein the reinforcing fibers are plant fibers.

6. The resin molding according to claim 1, wherein the connection part is constituted of an end part of any one substrate of the two types of substrates, wherein the one substrate is a plate-like substrate comprising reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, wherein the filling density of the reinforcing fibers in the end part of the one substrate is lower than the filling density of the reinforcing fibers in a base part of the one substrate, and wherein the reinforcing fibers are plant fibers.

7. The resin molding according to claim 1, wherein the connection part is constituted of an end part of any one substrate of the two types of substrates, wherein the one substrate is a plate-like substrate comprising reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, and wherein the first thermoplastic resin and a second thermoplastic resin contained in the injection-molded member are the same type of thermoplastic resin.

8. The resin molding according to claim 1, wherein the connection part is constituted of an end part of any one substrate of the two types of substrates, wherein the one substrate is a plate-like substrate comprising reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, wherein the filling density of the reinforcing fibers in the end part of the one substrate is lower than the filling density of the reinforcing fibers in a base part of the one substrate, and wherein the first thermoplastic resin and a second thermoplastic resin contained in the injection-molded member are the same type of thermoplastic resin.

9. The resin molding according to claim 1, wherein the connection part is constituted of an end part of any one substrate of the two types of substrates, wherein the one substrate is a plate-like substrate comprising reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, wherein the reinforcing fibers are plant fibers, and wherein the first thermoplastic resin and a second thermoplastic resin contained in the injection-molded member are the same type of thermoplastic resin.

10. The resin molding according to claim 1, wherein the connection part is constituted of an end part of any one substrate of the two types of substrates, wherein the one substrate is a plate-like substrate comprising reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, wherein the filling density of the reinforcing fibers in the end part of the one substrate is lower than the filling density of the reinforcing fibers in a base part of the one substrate, wherein the reinforcing fibers are plant fibers, and wherein the first thermoplastic resin and a second thermoplastic resin contained in the injection-molded member are the same type of thermoplastic resin.

11. The resin molding according to any one of claims 4 to 10, wherein the connection part is thinned gradually from the thickness of the base part of the one substrate to the thickness of the other substrate.

12. A method for producing a resin molding according to any one of claims 4 to 11, comprising:

a substrate preparation step of preparing the one substrate with the filling density of the reinforcing fibers in the connection part lower than the filling density of the reinforcing fibers in the base part of the one substrate;

a shaping step of shaping the one substrate; and an injection-molded member molding step of injecting a thermoplastic resin composition against the connection part of the one substrate, thereby connecting the other substrate.

The resin molding of the present invention is a resin molding in which two types of substrates differing in thermal shrinkage are connected together, wherein the thermal shrinkage of a connection part of the two types of substrates is a value between the respective thermal shrinkages of the two types of substrates. Thanks to such a configuration, it is possible to sufficiently reduce the difference in level that occurs after molding near a connection part of the two types of substrates due to the difference in thermal shrinkage and it is possible to improve the aesthetic nature as compared to a resin molding connected without specifying difference in thermal shrinkage.

When the connection part is constituted of an end part of any one substrate of the substrates, it is possible to adjust the thermal shrinkage of the connection part to a proper value by the resin composition in the connection part in view of the thermal shrinkage of the other substrate, and it is possible to easily produce a resin molding in which a difference in level is reduced and whose aesthetic nature can be further improved.

Moreover, when one substrate is a plate-like substrate including reinforcing fibers and a first thermoplastic resin binding the reinforcing fibers to each other and the other substrate is an injection-molded member connected in the plate face direction of the one substrate, wherein the thermal shrinkage of the other substrate is large as compared to the thermal shrinkage of the one substrate, the thermal shrinkage of the one substrate can be adjusted easily by the content of the reinforcing fibers in the one substrate, and the thermal shrinkage of the connection part can be adjusted to a proper value on the basis of the respective thermal shrinkages of the one substrate and the other substrate, and a resin molding in which a difference in level is reduced and the aesthetic nature can be improved can be formed more easily.

When the filling density of reinforcing fibers in an end part of the one substrate is lower than the filling density of reinforcing fibers in a base part of the one substrate, the thermal shrinkage of the connection part can be adjusted to a proper value between the thermal shrinkages of the one substrate and the other substrate easily, and since the connection part is a part of the one substrate, there is established a configuration in which the one substrate and the connection part are connected together smoothly at their boundary, and a resin molding whose aesthetic nature can be further improved can be formed.

Moreover, the case where the reinforcing fibers are plant fibers is preferable in view of environmental clean-up, such as reduction in carbon dioxide emissions or fixing of carbon dioxide. Especially, plant resources that grow fast and absorb much carbon dioxide, such as kenaf, are useful for a resin molding made of a composite material with resin.

When the first thermoplastic resin and the second thermoplastic resin contained in the injection-molded member are the same type of thermoplastic resin, a resin molding in which one substrate, an end connection part thereof, and the other substrate are joined together firmly in one piece can be formed.

Moreover, when the connection part is thinned gradually from the thickness of the one substrate to the thickness of the other substrate, no difference in level is visually observed near the connection part and a resin molding whose aesthetic nature can be further improved can be formed.

According to the method for producing a resin molding of the present invention, a resin molding having a prescribed shape and prescribed dimensions can be produced easily via a simple process by forming a connection part at an end part of one substrate, then shaping the one substrate into a prescribed planar shape by press-molding or the like, and, at the same time, connecting the other substrate to the connection part by injection-molding.

BRIEF DESCRIPTION OF DRAWINGS

FIG. 1(a) is a schematic cross-sectional view of one substrate before connection and FIG. 1(b) is a schematic cross-sectional view of the other substrate before connection.

FIG. 2 is a schematic cross-sectional view of a resin molding in which the one substrate and the other substrate in FIG. 1 have been connected together and which has a difference in level near the joined part.

FIG. 3(a) is a schematic cross-sectional view of one substrate before connection whose end part will become a connection part, and FIG. 3(b) is a schematic cross-sectional view of the other substrate before connection.

FIG. 4 is a schematic cross-sectional view of a resin molding in which the one substrate and the other substrate in FIG. 3 have been connected together and the thickness thereof is reduced gradually from the one substrate to the other substrate and no difference in level has been produced.

FIG. 5 is a schematic cross-sectional view of a resin molding in which there has been produced a difference in level near the joined part of one substrate and the other substrate molded as an aesthetic under shape part.

FIG. 6(a) is a schematic cross-sectional view of one substrate before connection whose end part will become a connection part, and FIG. 6(b) is a schematic cross-sectional view of the melting resin fluid before connection which will become an aesthetic under shape part.

DETAILED DESCRIPTION

Figure 7:
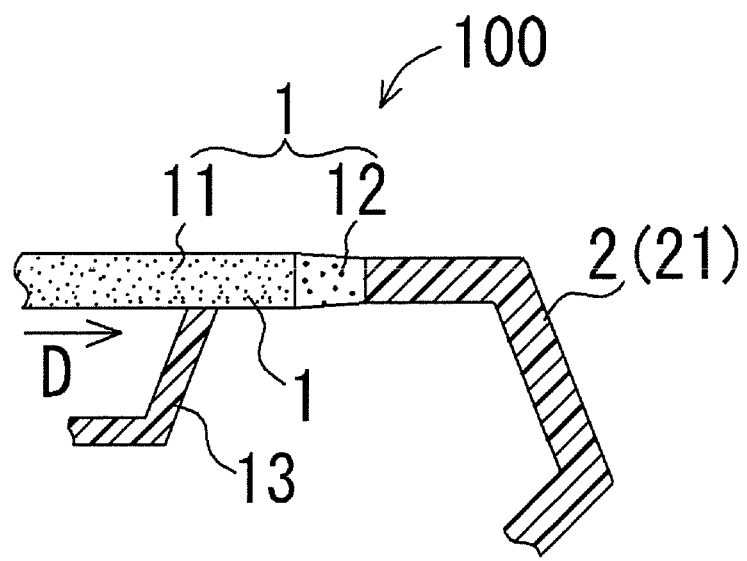
FIG. 7 is a schematic cross-sectional view of a resin molding in which the one substrate and the other substrate in FIG. 6 have been connected together and the thickness thereof is reduced gradually from the one substrate to the other substrate and no difference in level has been produced.

The present invention is hereafter described in detail with reference to drawings.

The particulars shown herein are by way of examples and for purposes of illustrative discussion of the embodiments of the present invention only and are presented for the purpose of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings, making apparent to those skilled in the art how some forms of the present invention may be embodied in practice.

[1] Resin Molding

A resin molding 100 of the present invention (see FIG. 4) is a resin molding in which two types of substrates differing in thermal shrinkage (see one substrate 1 and the other substrate 2 in FIG. 4) are connected together, wherein the thermal shrinkage of a connection part of the two types of substrates (see connection part 12 in FIG. 4) is a value between the respective thermal shrinkages of the two types of substrates.

While the thermal shrinkage of the connection part 12 of the two types of substrates 1, 2 is just required to be any value between the respective thermal shrinkages of the two types substrates 1, 2, it is preferred that the difference between the respective thermal shrinkages of the two types of substrates 1, 2 and the thermal shrinkage of the connection part 12 be large in order to reduce the difference in level produced near the connection part of the two types of substrates 1, 2 due to the difference in thermal shrinkage after cooling and improve aesthetic nature. That is, it is particularly preferred that the thermal shrinkage of the connection part 12 be a medium value of the respective thermal shrinkages of the two types of substrates 1, 2 or a value approximate to the medium value. Thanks to this, the difference in level between the two types of substrates is reduced sufficiently, so that the resin molding 100 with good aesthetic nature can be yielded.

While the connection part 12 may be constituted of an end part of any one substrate of the two types of substrates 1, 2 or alternatively may be constituted of a member other than the two types of substrates, it is preferred that the connection part be constituted of an end part of any one substrate of the two types of substrates (see a preliminary molding 1a including preliminary molded parts 11a and 12a that will become the one substrate 1 in FIG. 3 and a preliminary molding 2a that will become the other substrate 2 to be connected, and the connection part 12 in FIG. 4). As described above, if the connection part 12 is a part of the one substrate 1, the connection part 12 may have a configuration in which the thickness thereof is reduced gradually from the thickness of the base part 11 of the one substrate 1 to the thickness of the other substrate 2. Thanks to this, it is possible to yield a molding connected smoothly from the base part 11 of the one substrate 1 to the other substrate 2 via the connection part 12 and possible to yield a resin molding 100 with better aesthetic nature.

The resin molding 100 of the present invention may have a configuration in which one substrate 1 is a plate-like substrate including reinforcing fibers and a first thermoplastic resin binding the reinforcing fibers to each other and the other substrate 2 is an injection-molded member connected in the plate face direction of the one substrate 1, wherein the thermal shrinkage of the other substrate 2 is large as compared to the thermal shrinkage of the one substrate 1. In the resin molding 100, the other substrate 2 is extended in the plate face direction D of the substrate 1 at least near a connection part to the connection part 12 of the other substrate 2 (see FIG. 4).

The one substrate 1 is a plate-like body including reinforcing fibers and a first thermoplastic resin binding the reinforcing fibers to each other. The reinforcing fibers are not particularly limited and plant fibers, inorganic fibers, animal fibers, and the like can be used, and plant fibers are particularly preferred. Plant fibers are preferred from an environmental point of view, and they usually have a small specific gravity as compared to thermoplastic resin and can reduce the weight of resin moldings. Examples of the plant fibers include kenaf, hemp, cotton, palm fiber, and coconut fiber, and kenaf, which is a fast growing annual grass having a woody stem, is particularly preferred. Examples of the inorganic fibers include glass fibers, carbon fibers, metal fibers, etc. Such plant fibers and inorganic fibers are usually used in the form of long fibers that have been split.

Kenaf, which is used as a particularly preferable reinforcing fiber, is a fast growing annual grass having a woody stem and is a plant classified into malvaceae. The kenaf includes *hibiscus cannabinus* and *hibiscus sabdariffa* in scientific names, and further includes Indian hemp, Cuban kenaf, kenaf, Tai kenaf, mesta, bimli hemp, ambary hemp, Bombay hemp, etc. in common names.

The ratio of the reinforcing fibers to the first thermoplastic resin is not particularly limited and can be suitably set in accordance with the type, the application, etc. of the resin molding 100. For example, when reinforcing fibers are plant fibers such as kenaf, the proportion of the plant fibers can be set to 30 to 60% by mass, and especially 40 to 50% by mass where the total amount of the plant fibers and the first thermoplastic resin is 100% by mass.

Moreover, also in the case of a resin molding 100 including the one substrate 1 including reinforcing fibers and a first thermoplastic resin and the other substrate 2 constituted of an injection-molded member, wherein the thermal shrinkage of the other substrate 2 is large as compared to the thermal shrinkage of the one substrate 1, the thermal shrinkage of the connection part 12 of the one substrate 1 and the other substrate 2 is any value between the respective thermal shrinkages of the two types of substrates. Although the thermal shrinkage of the connection part 12 is just required to be any value between the respective thermal shrinkages of the two types of substrates, it is preferred that the difference between the respective thermal shrinkages of the two types of substrates and the thermal shrinkage of the connection part 12 be large, and it is particularly preferred that the thermal shrinkage of the connection part 12 be a medium value of the respective thermal shrinkages of the two types of substrates or a value approximate to the medium value. Thanks to this, the difference in level produced near the connection part of the two types of substrates is reduced sufficiently, so that a resin molding 100 with good aesthetic nature can be yielded.

It is preferred that the connection part 12 be constituted of an end part of the one substrate 1 of the two types of substrates [see the preliminary molding 1*a* including the preliminary molded parts 11*a* and 12*a* that will become the one substrate 1 in FIG. 6 and the melting resin fluid 2*b* (21*a*) that will become the other substrate 2 to be connected, and the connection part 12 in FIG. 7]. Thus, the connection part 12 constituted of an end part of the one substrate 1 can be formed easily by adjusting the filling density of reinforcing fibers in the preliminary molded part 12*a*, which will become the connection part 12, of the preliminary molding 1*a* to be lower than the filling density of reinforcing fibers in the preliminary molded part 11*a*, which will become a base part 11. In this case, according to the difference between the filling density of reinforcing fibers in the connection part 12 constituted of the end part of the one substrate 1 and the filling density of reinforcing fibers in the base part 11, the thermal shrinkage of the connection part 12 can be adjusted easily to a value between the respective thermal shrinkages of the two types of substrates, and preferably to a medium value of the respective thermal shrinkages of the two types of substrates or a value approximate to the medium value.

As described above, if the connection part 12 is a part of the one substrate 1, the connection part 12 can be in a configuration in which the thickness thereof is reduced gradually from the thickness of the base part 11 of the one substrate 1 to the thickness of the other substrate 2. Thanks to this, it is possible to yield a molding connected smoothly from the base part 11 of the one substrate 1 to the other substrate 2 via the connection part 12 and possible to yield a resin molding 100 with better aesthetic nature.

The one substrate 1 including reinforcing fibers and a first thermoplastic resin binding the reinforcing fibers to each other is molded as a plate-like body. And when the resin molding 100 is an interior material for vehicles, such as a door trim or a roof trim, an under shape structure 13 made of a thermoplastic resin for attaching to a vehicle panel, such as a retainer bracket, a boss or a runner, is formed by injection-molding on a surface (rear surface) of the plate-like body (see a melting resin fluid 13*a* for forming a retainer bracket 13 in FIG. 6, and FIG. 7).

In the resin molding 100, the other substrate 2 constituted of an injection-molded member is formed by injecting a second thermoplastic resin against an end surface of the one substrate 1 (an end surface of the connection part 12). Moreover, at least near a boundary surface of the other substrate 2 with the connection part 12, the other substrate 2 is extended in the plate face direction D of the substrate 1. In this case, in the vicinity of the end surface of the connection part 12, the second thermoplastic resin injected may enter the connection part 12 or reinforcing fibers may enter the other substrate 2 depending on the injection pressure, which, however, does not cause any particular problems.

Although the other substrate 2 is extended from the end surface of the one substrate 1 having a plate-like shape in the plate face direction D thereof at least near the boundary surface with the connection part 12, the other substrate 2 may also be configured to have a plate-like part further extended as a part of the injection-molded member. Although the plate-like part may have been formed in any shape, the plate-like part may be an aesthetic under shape part 12 (see a melting resin fluid 21*a* for forming the aesthetic under shape part 12 in FIG. 6, and FIG. 7) when the resin molding 100 is an interior material for vehicles or the like.

Moreover, when the resin molding 100 is an interior material for vehicles or the like and the aesthetic under shape part 21 has been formed, the resin molding 100 may have a rib that is arranged on the side of another surface that will not be an aesthetic surface from the one substrate 1 to the plate-like part and that stands almost perpendicularly to the plate face direction of the one substrate 1. The rib can be formed as a part of an injection-molded member when injecting a second thermoplastic resin to be used for the formation of a plate-like part that is allowed to serve as the other substrate 2 and the aesthetic under shape part 12. By forming a rib in such a manner, an outer edge part of the resin molding 100 can be strengthened and a prescribed aesthetic surface shape can be maintained when the resin molding 100 is an interior material for vehicles or the like, and an interior material which is not distorted easily upon coming into contact with other articles, etc. can be made.

The one substrate 1 is formed using the first thermoplastic resin. The injection-molded member to constitute the other substrate 2 is formed using the second thermoplastic resin. Although the first thermoplastic resin and the second thermoplastic resin may be the same type of resin or alternatively may be different types of resin, it is preferred that they be the same type of resin in order to sufficiently and easily join an end surface of the one substrate 1 (an end surface of the connection part 12) with an end surface of the other substrate 2 constituted of the injection-molded member. The same type of resin referred to herein means that the main monomers to constitute the respective resins (polymers) are the same, and it may be a resin made of a homopolymer composed of the monomer or alternatively may be a resin made of a copolymer in which a prescribed amount of other monomers is copolymerized.

The first and second thermoplastic resins are not particularly limited and examples thereof include polyolefin resins, such as polypropylene and polyethylene, acrylic resins, such as polymethyl acrylate and polymethyl methacrylate, polyamide resins, such as Nylon-6 and Nylon-66, and polyester resins, such as polyethylene terephthalate and polybutylene terephthalate. Of the various types of resins, the polyolefin resins, especially, polypropylene resins, such as polypropylene homopolymers, are preferred. These thermoplastic resins are each blended with and caused to contain a prescribed amount of additive usually used for such types of resins, such as antioxidants, UV absorbers, lubricants, and antistatic agents, as necessary, thereby forming a thermoplastic resin composition, and then this resin composition is used for molding.

The resin molding 100 of the present invention can be used in a wide variety of product fields, such as vehicle-related fields and building-related fields. In the vehicle-related field, it is suitable as interior materials, exterior materials, structural materials, etc. of vehicles. For example, it is used as a door trim, a pillar garnish, a seat back board, a roof trim, an instrument panel, a console box, a dashboard, and a deck trim. In addition, it can also be used for various types of transfer means or transport means such as railroad vehicles, ships, and airplanes. Moreover, in the building-related field, it is suitable as interior materials, exterior materials and structural materials of various types of buildings. For example, it is used as a door mounting material, a door structural material, a mounting material or a structural material of various types of furniture (e.g., desk, chair, shelf, or chest of drawers), etc.

[2] Method for Producing Resin Moldings

A method for producing a resin molding of the present invention includes a substrate preparation step of preparing the one substrate 1 with the filling density of the reinforcing fibers in the connection part 12 lower than the filling density of the reinforcing fibers in the base part 11 of the one substrate 1 (see a preliminary molding 1a including preliminary molded parts 11a and 12a that will become the one substrate 1 in FIG. 6), a shaping step of shaping the one substrate 1, and an injection-molded member molding step of injecting a thermoplastic resin composition against the connection part 12 of the one substrate 1, thereby connecting the other substrate 2 (see a melting resin fluid 2b including a melting resin fluid 21a that will become an aesthetic under shape part 21 in FIG. 6).

The substrate preparation step is a step of preparing one substrate 1 including a base part 11 and a connection part 12 by utilizing the difference in filling density of reinforcing fibers, and the shaping step is a step of shaping the one substrate 1 into a plate-like molding with a prescribed planar shape. An extension part formation step is a step of injecting a resin composition against an end surface of the one substrate 1 shaped (an end surface of the connection part 12), thereby extending the other substrate 2 from the end surface in the plate face direction D of the one substrate 1. The aforementioned aesthetic under shape part 21 can be provided as a part of the other substrate 2 in the extension part formation step.

The method of molding the one substrate 1 is not particularly limited, but the substrate is usually molded by press-molding. Since the one substrate 1 is provided with the other substrate 2 by injecting a resin composition against its end surface (an end surface of the connection part 12), the molding of the resin molding 100 is performed by insert molding. As the preliminary molding that will become the one substrate 1 (see a preliminary molding 1a including a preliminary molded part 11a that will become the base part 11 of the one substrate 1 in FIG. 6 and a preliminary molded part 12a that will become the connection part 12), which is to be inserted into a mold, there can be used, for example, a web formed by mixing reinforcing fibers such as plant fibers with a first thermoplastic resin. In the formation of the web, the first thermoplastic resin is mixed in the form of fiber, powder, or the like, and mixing in the form of fiber is preferred because this makes the web formation easier.

The one substrate 1 can be molded by heating a preliminary molding, such as a web, formed as described above to a prescribed temperature according to the melting point of the first thermoplastic resin, etc., then inserting it into a mold having a cavity with a prescribed shape, and subsequently pressurizing it to shape. Moreover, the one substrate 1 and the other substrate 2 can be molded at the same time by injecting a resin composition including a second thermoplastic resin simultaneously with the pressurization to the preliminary molding such that the resin composition flows toward a surface that will become an end surface of the one substrate 1 (an end surface of the connection part 12) [see a melting resin fluid 2b that will become the other substrate 2 in FIG. 6 (a melting resin fluid 21a that will become an aesthetic under shape part 21)], and then cooling. When the preliminary molding is heated and pressurized, the interlacing points of the reinforcing fibers are bound with the molten first thermoplastic resin, and thus one substrate 1 reinforced by fibers can be yielded.

Figure 8:
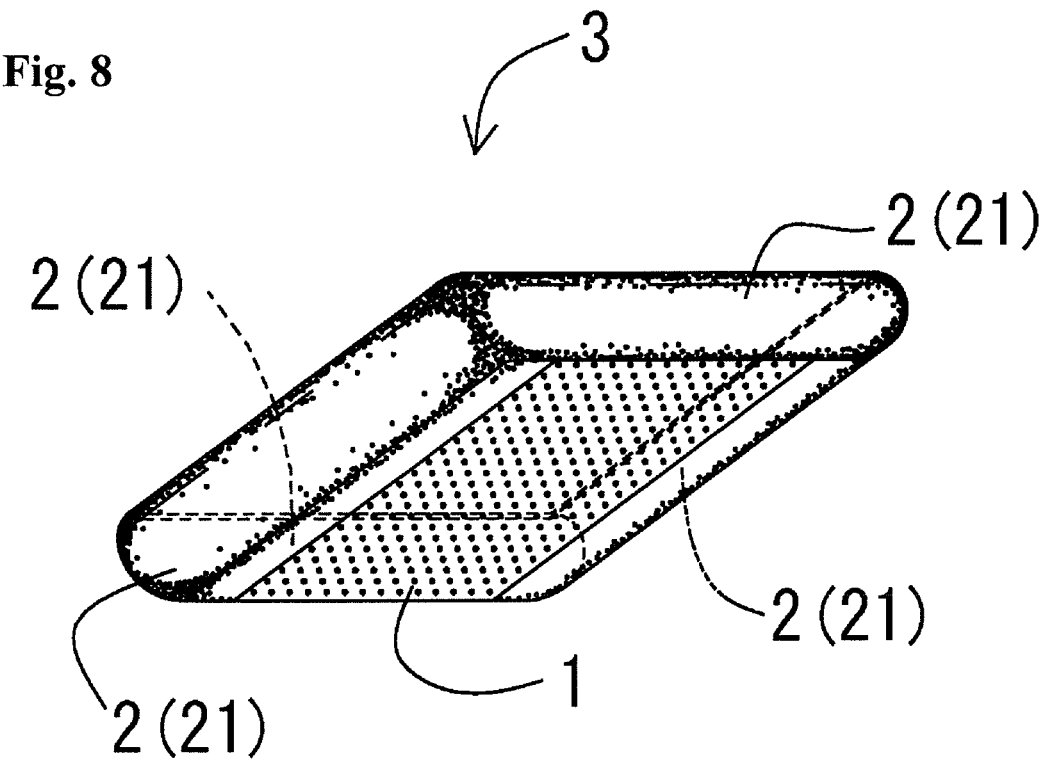
FIG. 8 is a schematic perspective view of one example of the resin molding of the present invention.
Figure 9:
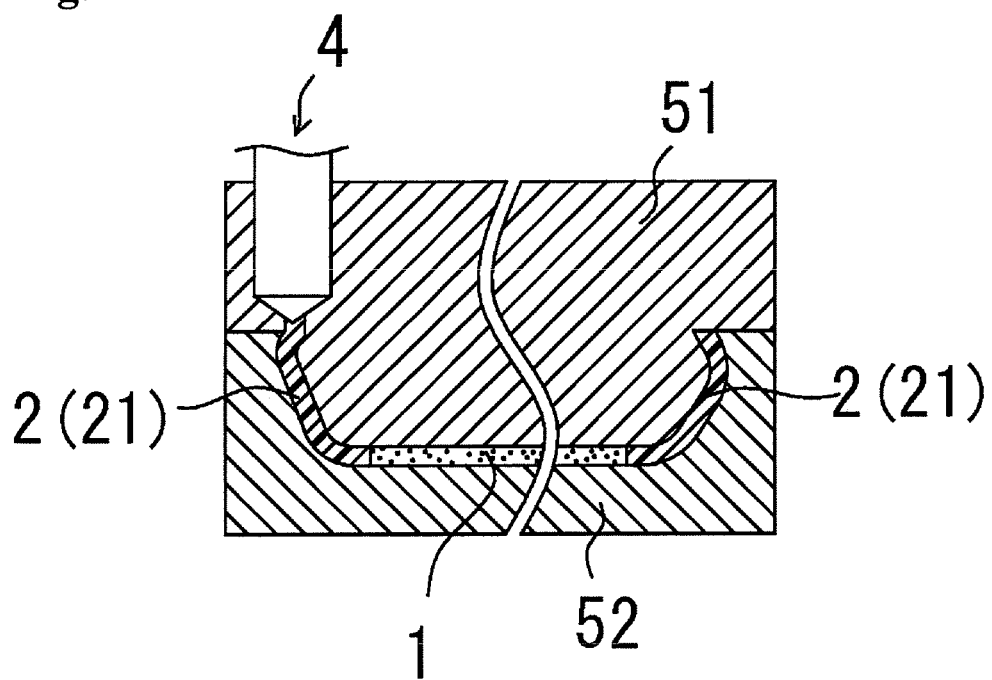
FIG. 9 is a schematic cross-sectional view illustrating the production of the resin molding of the present invention.

Moreover, when the resin molding 100 is an interior material for vehicles, or the like, by using a prescribed mold when injecting the resin composition including the second thermoplastic resin such that the resin flows toward a surface that will become an end surface of the one substrate 1 (an end surface of the connection part 12) and thereby molding the other substrate 2, it is possible to simultaneously mold a plate-like part further extending from an end surface of a part extending in the plate face direction of the one substrate 1, thereby forming the aforementioned aesthetic under shape part 21 (see FIG. 7) [see FIG. 9 illustrating an embodiment in which a resin molding is molded using a mold composed of a stationary mold (core mold) 51 equipped with an injection-molding machine 4 and a mobile mold (cavity mold) 52, and FIG. 8 illustrating a resin molding 3 obtained by releasing from the mold after thus molding] and it is also possible to form a rib at the same time.

It is noted that the foregoing examples have been provided merely for the purpose of explanation and are in no way to be construed as limiting of the present invention. While the present invention has been described with reference to exemplary embodiments, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The resin molding of the present invention and a method for producing the same can be used in a wide variety of product fields such as vehicle-related fields and building-related fields. Especially, they are useful in the technical field of interior materials for vehicles, such as door trims and roof trims.

What is claimed is:

1. A resin molding comprising:
   two types of substrates differing in thermal shrinkage that are connected together,
   wherein a thermal shrinkage of a connection part of the two types of substrates is a value between the respective thermal shrinkages of the two types of substrates,
   wherein the connection part includes an end part of any one substrate of the two types of substrates,
   wherein the one substrate is a plate shaped substrate comprising reinforcing fibers and a first thermoplastic resin binding the reinforcing fibers to each other and the other substrate is an injection-molded structure connected in a plate face direction of the one substrate,
   wherein the thermal shrinkage of the other substrate is greater than the thermal shrinkage of the one substrate,
   wherein the reinforcing fibers are plant fibers,
   wherein the other substrate does not include plant fibers,
   the one substrate includes first and second surfaces that oppose one another, the other substrate includes first and second surfaces that oppose one another, and the connection part includes first and second surfaces that oppose one another,
   at ends of the two types of substrates where the two types of substrates are connected together, the first surface of the one substrate is disposed outwardly from the first surface of the other substrate, and the second surface of the one substrate is disposed outwardly from the second surface of the other substrate, and
   the first surface of the connection part gradually slopes inwardly from the first surface of the one substrate toward the first surface of the other substrate to mask a visual difference in level between the first surface of the one substrate and the first surface of the other substrate, and the second surface of the connection part gradually slopes inwardly from the second surface of the one substrate toward the second surface of the other substrate to mask a visual difference in level between the second surface of the one substrate and the second surface of the other substrate.

2. The resin molding according to claim 1, wherein a filling density of the reinforcing fibers in the end part of the one substrate is lower than a filling density of the reinforcing fibers in a base part of the one substrate.

3. The resin molding according to claim 1, wherein the first thermoplastic resin and a second thermoplastic resin contained in the injection-molded structure are a same type of thermoplastic resin.

4. The resin molding according to claim 1, wherein a filling density of the reinforcing fibers in the end part of the one substrate is lower than a filling density of the reinforcing fibers in a base part of the one substrate, and
   wherein the first thermoplastic resin and a second thermoplastic resin contained in the injection-molded structure are a same type of thermoplastic resin.

5. The resin molding according to claim 1, wherein the connection part is thinned gradually from a thickness of the base part of the one substrate to a thickness of the other substrate.

6. A method for producing a resin molding according to claim 1, comprising:
   preparing the one substrate with a filling density of the reinforcing fibers in the connection part lower than a filling density of the reinforcing fibers in the base part of the one substrate;
   shaping the one substrate; and
   injecting a thermoplastic resin composition against the connection part of the one substrate, thereby connecting the other substrate.

* * * * *